United States Patent [19]

Kruse et al.

[11] 3,784,391

[45] Jan. 8, 1974

[54] FINELY DIVIDED HOLLOW MICROCAPSULES OF POLYMERIC RESINS

[75] Inventors: Uno Kruse, Neptune; Daniel F. Herman, Princeton, both of N.J.

[73] Assignee: N L Industries, Inc., New York, N.Y.

[22] Filed: Dec. 27, 1971

[21] Appl. No.: 212,685

[52] U.S. Cl............... 106/170, 252/316, 260/2.5 B, 260/296 R, 260/29.6 PM, 260/34.2
[51] Int. Cl... C08b 27/22, C08b 21/06, C08f 47/16
[58] Field of Search.................. 252/316; 260/2.5 B, 260/29.6 PM, 34.2; 106/170

[56] References Cited
UNITED STATES PATENTS
3,686,701   8/1972   Charle .............................. 252/316

Primary Examiner—Theodore Morris
Attorney—Robert L. Lehman et al.

[57] ABSTRACT

Spheroidal shaped, hollow microcapsules of thermoplastic polymeric resins have been prepared which have an average diameter of from $0.1\mu$ to $1.0\mu$. Each of the microcapsules are filled with air and have an average wall thickness of from about 3 percent to 30 percent of the diameter of the microcapsules.

These microcapsules are obtained from an emulsion comprising water and microcapsules of the polymeric resin containing a non-solvent for the resin. The microcapsules are suspended in the water and the non-solvent is present inside the microcapsules.

Either one of these products, i.e. the microcapsules themselves or the water emulsion containing the microcapsules described above, may be used as an opacifier in paint or other systems.

12 Claims, No Drawings

FINELY DIVIDED HOLLOW MICROCAPSULES OF POLYMERIC RESINS

BACKGROUND OF THE INVENTION

Various types of microcapsules have been prepared by the prior art and have been used for a variety of purposes. Most of the prior art microcapsules, however, are made from polymers or prepolymers which are soluble in water. The microcapsules produced from such materials are physically weak in structure. When these microcapsules are incorporated into aqueous vehicle systems, the walls of the microcapsules tend to collapse during the drying operation.

Microcapsules have also been produced in a wide range of sizes, i.e. from submicron to 100 microns. Most of these microcapsules, however, have been formed as large individual particles or as large particles made up of a multitude of small microcapsules forming large aggregated masses.

In the instant invention, microcapsules have been produced which are submicron in size and which form tough and rigid walls which withstand rough handling and the forces involved during the drying operation. In addition, the microcapsules formed are discrete individual microcapsules. They are not formed as aggregated or agglomerated masses.

SUMMARY OF THE INVENTION

A new type of opacifier for paint and the like has been produced comprising spheroidal shaped, hollow microcapsules of thermoplastic polymeric resins having an average diameter of from $0.1\mu$ to $1.0\mu$. These microcapsules are filled with air and have an average wall thickness of from about 3 percent to 30 percent of the diameter of the microcapsules.

When these microcapsules are used as an opacifier in paint and other systems, it is preferred to produce microcapsules having a wall thickness of from about 3 percent to 10 percent of the diameter of the microcapsules. With these wall thicknesses, the void volumes in the microcapsules are from 50 percent to 85 percent of the total volume of the microcapsules. When the wall thicknesses are greater than 10 percent, the microcapsules formed are useful as fillers for plastics, paper and textiles and as chromatographic absorbents.

This new product is prepared by a process which comprises dissolving the polymeric resin in a mixture of a solvent and a non-solvent for the resin to form an organic solution, the amount of solvent added being from 3 to 10 parts for each part of polymeric resin and the amount of non-solvent added being from 0.05 to 3 parts for each part of polymeric resin, adding the polymeric resin, solvent and non-solvent solution to water and a surface active agent with high shear to form an oil-in-water emulsion, said emulsion containing from 0.5 to 3 parts of organic phase for each part of water, the amount of said surface active agent being from 0.0005 to 0.005 part for each part of said organic phase, removing the solvent from said emulsion by distillation under reduced pressure and then removing the water and the non-solvent from said dispersed particles by drying, thus forming microcapsules of said resin filled with air.

The process may be terminated after the solvent is distilled off and before the non-solvent is removed. At this stage a useful emulsion is obtained which may be mixed directly into a paint system.

This emulsion contains microcapsules of a polymeric resin suspended in water. The non-solvent is present inside the microcapsules. The suspended microcapsules have a size from $0.1\mu$ to $1.0\mu$. When this emulsion is spray dried, the water and non-solvent are removed and the microcapsules of the polymeric resin are obtained. The microcapsules obtained are also of size from $0.1\mu$ to $1.0\mu$ and are filled with air.

The emulsion described above contains by weight from 0.1 to 0.8 part of microcapsules filled with the non-solvent for each part of water. The amount of non-solvent present in the microcapsules is from 0.05 to 3 parts for each part of resin. The emulsion also contains from 0.0005 to 0.005 part of a surface active agent for each part of microcapsules which contains internally the non-solvent.

When this emulsion is added to a latex paint mixture and then spread onto a surface to form a film and allowed to dry, the non-solvent in the microcapsules is evolved along with the other volatile ingredients and the dried paint film contains the same hollow microcapsules filled with air as those described above.

DESCRIPTION OF THE PREFERRED EMBODIMENTS

The thermoplastic resins employed in the instant invention include polymethyl methacrylate, cellulose acetate butyrate, polystyrene, polyvinyl chloride, polyvinyl acetate and copolymers and mixtures thereof.

The solvent for the polymer preferably should be slightly soluble in water but still immiscible in water. It must have a boiling point lower than the boiling point of the non-solvent and it must be capable of retaining the polymer in the solvent when the non-solvent is added to the solvent-polymer solution. Satisfactory solvents include either ethyl acetate or propyl acetate.

The amount of non-solvent employed is critical since the amount used determines the final air void volume in the microcapsules formed. The non-solvent should be immiscible in water. It also must have a boiling point of at least 25°C. above the boiling point of the solvent. The non-solvents useful in the instant invention include aliphatic organic compounds selected from the group consisting of mineral spirits, decane, dodecane, heptane, pentanol and mixtures thereof. By the term "mineral spirits" is meant to include aliphatic hydrocarbons having from six to 12 carbon atoms.

In carrying out the process of the instant invention, the polymeric resin is admixed with the solvent and the non-solvent to form a solution. This organic solution is then added with vigorous stirring to water to form an oil-in-water emulsion. The emulsion is formed in the presence of any well-known surface active agent for producing oil-in-water emulsions.

In order to describe more fully the instant invention, the following examples are presented:

EXAMPLE 1

Twenty grams of polymethyl methacrylate were dissolved in 80 grams of ethyl acetate. To this solution were added 20 grams of mineral spirits with agitation to produce a homogeneous solution containing the polymer, the solvent and non-solvent.

This solution was then added to 100 grams of water with high shear to produce an emulsion. The water employed contained 10 grams of ethyl acetate to saturate the water with ethyl acetate and 0.2 gram of sodium lauryl sulfate which was present as the surface active agent. The emulsion produced contained submicron size droplets of the organic mixture suspended in the water.

This emulsion was then subjected to a distillation operation where the ethyl acetate was removed. The emulsion was stripped at 30°C. – 40°C. and at 100 – 160 mm mercury, to remove the ethyl acetate and to precipitate the polymer around the non-solvent cores, thus producing microcapsules of polymethyl methacrylate filled with mineral spirits.

After the distillation operation the yield was 130 grams of emulsion containing 19 grams of solids.

A portion of the emulsion was spray dried, to remove the water and the mineral spirits, and air filled microcapsules of the polymeric resin were obtained.

These microcapsules were discrete and had a particle size from $0.1\mu$ to $1.0\mu$ with a wall thickness of about 8 percent of the diameter of the microcapsules. These microcapsules were tough and strong and had an average air void volume of 60 percent of the total volume of the microcapsules. These microcapsules were easily incorporated as the opacifier in a latex paint system without breakage. The point was prepared as follows:

Thirty grams of the dried microcapsules were mixed with 66.9 grams of an acrylic latex formulation to form a latex paint. The paint had solids content of 44.7 percent.

The paint formulation contained the following ingredients:

30 grams — H₂O
30 grams — acrylic latex (44.5% solids)
6 grams — 1.25% QP-4400 hydroxyethyl cellulose (Union Carbide Corporation)
0.6 gram — Tamol 731 dispersant (Rohm & Haas Na salt of poly-carboxylic acid)
0.3 gram — Balab 748 Bubble Breaker (Balab Corporation)

The latex paint was spread onto a surface and allowed to dry. The dried film had a void volume of 48 percent and a hiding power of 120 sq. ft./gal. at a contrast ratio of 0.98. The reflectance over black ($R_B$) was 96.9 percent for an 11.9 mil film.

EXAMPLE 2

In this example a portion of the emulsion described in Example 1 was used in a latex paint without spray drying the emulsion. The emulsion containing polymethyl methacrylate microcapsules filled with mineral spirits was centrifuged to consolidate the microcapsules to produce a thick paste of microcapsules containing 30 percent solids. This paste was mixed with acrylic latex in proportions of 10 parts to 3 parts respectively and dispersed in a high speed blender. When this latex mixture was spread onto a flat surface and dried, a white and opaque film was formed. The dried film contained the same type of air filled microcapsules of the polymeric resin which was produced in Example 1. These microcapsules in the film were of the same size, $0.1\mu$ to $1.0\mu$ in diameter, with a wall thickness of about 8 percent of the diameter of the microcapsules. Again the microcapsules in the film had an average void volume of 60 percent of the total volume of the microcapsules.

The dried film had a hiding power and a reflectance over black value similar to the properties of the paint film described in Example 1.

EXAMPLES 3–7

In these examples the procedure of Example 1 was repeated except that various amounts of the ingredients were employed. The various amounts of ingredients used are recorded in the following table:

| | Example No. | | | | |
|---|---|---|---|---|---|
| | 3 | 4 | 5 | 6 | 7 |
| Polymethyl Methacrylate (g) | 30 | 20 | 30 | 14 | 12 |
| Ethyl Acetate (g) | 120 | 110 | 210 | 112 | 120 |
| Mineral Spirits (g) | 30 | 30 | 60 | 35 | 36 |
| Water (g) | 100 | 100 | 150 | 105 | 90 |
| Ethyl Acetate (g) (added to water) | 10 | 10 | 15 | 10 | 9 |
| Sodium Lauryl Sulfate (g) | 0.3 | 0.2 | 0.3 | 0.16 | 0.17 |

The microcapsules produced in each of these examples were of size from $0.1\mu$ to $1.0\mu$. They had an average air void volume from 60 percent to 85 percent of the total volume of the microcapsules the air void volumes of the various microcapsules were as follows:

| | Example No. | | | | |
|---|---|---|---|---|---|
| | 3 | 4 | 5 | 6 | 7 |
| Air void volume (%) | 60 | 70 | 76 | 80 | 82.4 |

The microcapsules produced in each of these examples were added to a latex paint as follows:
Example 3 — Same as Example 1
Example 4 — Same as Example 1 except an additional 12 grams of water were added
Example 5 — Same as Example 1 except an additional 33 grams of water were added
Example 6 — Same as Example 1 except an additional 30 grams of acrylic latex were added
Example 7 — Same as Example 1 except an additional 33 grams of acrylic latex and 4 grams of additional water were added.

The paint films produced had the following properties:

| Example No. | Film Void Volume | Hiding Power Sq. Ft./Gal. |
|---|---|---|
| 3 | 48% | 120 |
| 4 | 53% | 130 |
| 5 | 62% | 160 |
| 6 | 45% | 80 |
| 7 | 46% | 85 |

EXAMPLE 8

In this example 30 grams of polymethyl methacrylate were dissolved in 165 grams of ethyl acetate and 45 grams of n-heptane. This solution was added with high shear to 150 grams of water containing 15 grams of ethyl acetate and 0.3 gram of sodium lauryl sulfate. The emulsion was then stripped of ethyl acetate by distillation at 30°–40°C. and 100–160 mm mercury. After stripping, the emulsion obtained weighed 185 grams and contained 15.2 percent solids.

Thirty-three grams of this emulsion (containing 5 grams solids) were mixed with 3 grams of acrylic latex and 6 grams of a 3 percent solution of hydroxyethyl cellulose. This mixture was applied to a surface and allowed to dry.

The dried film contained air filled microcapsules $0.1\mu$ to $1.0\mu$ in size. The dried film had a hiding power similar to that obtained in Example 1.

EXAMPLE 9

In this example 100 grams of half second butyrate (cellulose acetate butyrate containing 37 percent butyl groups and having a viscosity of 0.3–0.5 second), were dissolved in a mixture of 700 grams of ethyl acetate and 75 grams of mineral spirits. This solution was added with high shear to 1,200 grams of water containing 120 grams of ethyl acetate and 2 grams of sodium lauryl sulfate. The emulsion formed was stripped of ethyl acetate by distillation at 35°C. and 100–160 mm mercury. The stripped emulsion was then spray dried to produce 98 grams of hollow microcapsules. These air filled microcapsules had a size range from $0.1\mu$ to $1.0\mu$ and contained 54 percent voids.

Thirty grams of these microcapsules were mixed with 30 grams of latex, 30 grams of water, 0.6 gram of Tamol 731 (Rohm & Haas) and 0.075 gram of hydroxyethyl cellulose thickener. This mixture was applied to a surface and allowed to dry. The dried film had a hiding power of 100–110 sq. ft./gal. and a reflectance over black ($R_B$) of 95.08 percent.

EXAMPLE 10

In this example a copolymer was employed. The copolymer was produced by admixing 50 grams of cellulose acetate butyrate, 95 grams of methyl methacrylate monomer, 5 grams of methacrylic acid and adding this mixture to 500 grams of ethyl acetate containing 2 grams of tertiary dodecyl mercaptan and 1 gram of benzoyl peroxide to form a solution. This solution was polymerized by refluxing for four hours at 77°C.

Sixty-five grams of this polymer solution were mixed with 30 grams of ethyl acetate and 15 grams of mineral spirits. This solution was emulsified in 150 grams of water containing 15 grams of ethyl acetate and 0.2 gram of sodium lauryl sulfate. The emulsion obtained was stripped of ethyl acetate and centrifuged to yield a paste containing 23 percent solids.

Eight grams of this paste were mixed with 2 grams of acrylic latex to form a paint. When this paint was spread onto a flat surface and dried, it produced a white opaque film. The film contained microcapsules which had a size range of from $0.1\mu$ to $1.0\mu$ and the paint film had a hiding power similar to that obtained in Example 1.

EXAMPLE 11

In this example the same procedure of that described in Example 9 was repeated except that no mineral spirits was used. The product obtained consisted of submicron size solid microspheres, from $0.1\mu$ to $1.0\mu$ in size. These solid microspheres when incorporated into a latex paint formulation produced clear films with no opacity. This clearly sows that the presence of the nonsolvent is necessary to produce opaque films.

EXAMPLE 12

In this example, 150 grams of polystyrene were dissolved in 850 grams of ethyl acetate and 150 grams of mineral spirits. This solution was emulsified with high shear in 1,200 grams of water containing 120 grams of ethyl acetate and 2 grams of sodium lauryl sulfate until particle size of the emulsion was less than 1 micron. The ethyl acetate was stripped off at 35°C. and 100–160 mm mercury. The stripped emulsion was spray dried at 150°C and 125 grams of hollow polystyrene microcapsules were obtained. The hollow polystyrene microcapsules had an average size range of from $0.1\mu$ to $1.0\mu$ and the void volume was 60 percent of the total void volume of the microcapsules. When the microcapsules were incorporated into a latex formulation and applied to a substrate and allowed to dry, a white opaque film was formed.

EXAMPLE 13

In this example 200 grams of polymethyl methacrylate were mixed with 800 grams of ethyl acetate and 207 grams of n-pentanol. This solution was then emulsified in 1,500 grams of water containing 150 grams of ethyl acetate and 40 grams of n-pentanol and 25 grams of Triton 770 (30 percent solution of sodium alkylaryl polyether sulfate) made by Rohm and Haas, until the particle size of the emulsion was less than 1 micron. After removing the ethyl acetate at 35°C. and mild vacuum, the stripped emulsion was spray dried.

Again microcapsules of similar size and void volume were obtained. When these microcapsules were used in latex paint systems, white opaque films were obtained when dried.

EXAMPLE 14

In this example a partially hydrolyzed copolymer of polyvinyl chloride and polyvinyl acetate was employed. 140 grams of Union Carbide's Bakelite VAGH (91 percent polyvinyl chloride and 9 percent polyvinylacetate) were dissolved in a mixture of 1,000 grams ethyl acetate and 140 grams mineral spirits. The solution was emulsified in 1,300 grams of water containing 130 grams ethyl acetate and 1.4 gram sodium lauryl sulfate until the particle size of the emulsion was less than 1 micron. After distilling off the ethyl acetate at 35°C. and 100–160 mm mercury, the stripped emulsion was spray dried to give less than 1 micron hollow microcapsules containing about 60 percent by volume air.

These microcapsules were used in a latex paint formulation as follows:

Forty grams of these microcapsules were mixed with 40 grams of an acrylic latex (44.5 percent solids), 37 grams of water, 0.1 gram of hydroxyethyl cellulose, 1 gram of Tamol 731 dispersant. This mixture was applied to a substrate and allowed to dry. Again a white opaque film was formed on drying.

EXAMPLE 15

The procedure of Example 1 was repeated except that propyl acetate was used as a solvent in place of ethyl acetate.

The microcapsules produced were similar to those produced in Example 1. When these microcapsules were incorporated into a latex paint formulation, a white opaque film similar to those produced in the previous examples was produced.

While this invention has been described and illustrated by the examples shown, it is not intended to be strictly limited thereto, and other variations and modi-

We claim:

1. Spheroidal shaped, hollow microcapsules of thermoplastic polymeric resins selected from the group consisting of polymethyl methacrylate, cellulose acetate butyrate, polyvinyl chloride, polyvinyl acetate, polystyrene and copolymers and mixtures thereof, said microcapsules having an average diameter of from 0.1 $\mu$ to 1.0 $\mu$, said microcapsules containing an average air void volume of from 50 percent to 85 percent of the total volume of said microcapsules and the average wall thickness of said microcapsules being from 3 percent to 10 percent of the diameter of said microcapsules, said microcapsules prepared by admixing said resin with a solvent and non-solvent for said resin to form a solution, said solvent and said non-solvent being immiscible in water, adding the resin-solvent-non-solvent solution to water and surface active agent with high shear to form an oil-in-water emulsion, the oil droplets in said emulsion containing the resin, the solvent and the non-solvent and removing the solvent from said emulsion by distillation under reduced pressure and forming microcapsules of said polymeric resin during the removal of said solvent, said microcapsules being suspended in said emulsion and containing the non-solvent in the interior of said microcapsules, and removing the non-solvent and the water to form said microcapsules.

2. An aqueous emulsion comprising water, spheroidal shaped micro-capsules of thermoplastic polymeric resin and a non-solvent for said resin, and a surface active agent, said resin selected from the group consisting of polymethyl methacrylate, cellulose acetate butyrate, polyvinyl chloride, polyvinyl acetate, polystyrene and copolymers and mixtures thereof, said microcapsules being suspended in said emulsion and said non-solvent being present and filling the interior of said microcapsules, said emulsion prepared by admixing said resin with a solvent and non-solvent for said resin to form a solution, said solvent and said non-solvent being immiscible in water, adding the resin-solvent-non-solvent to water and a surface active agent with high shear to form an oil-in-water emulsion in which the oil droplets contain the resin, the solvent and the non-solvent, removing the solvent from said emulsion by distillation under reduced pressure thus forming the microcapsules of said polymeric resin in said emulsion, the non-solvent being present in the interior of said microcapsules, said microcapsules having an average diameter of from 0.1 $\mu$ to 1.0 $\mu$, said emulsion containing by weight from 0.1 to 0.8 part of water, the amount of non-solvent present in said microcapsules is from 0.05 to 3 parts for each part of resin, said emulsion containing from 0.0005 to 0.005 part of a surface active agent for each part of microcapsules filled with said non-solvent.

3. Composition according to claim 2 in which the non-solvent employed is an aliphatic organic compound selected from the group consisting of mineral spirits, decane, dodecane, heptane, pentanol and mixtures thereof.

4. A method for preparation of spheroidal shaped, hollow microcapsules of thermoplastic resin, which comprises admixing said resin with a solvent and non-solvent for said resin to form a solution, said solvent and said non-solvent being immiscible in water, said resin selected from the group consisting of polymethyl methacrylate, cellulose acetate butyrate, polyvinyl chloride, polyvinly acetate, polystyrene and copolymers and mixtures thereof, said solvent selected from the group consisting of ethyl acetate propyl acetate and mixtures thereof, the amount of said solvent employed being from 3 to 10 parts for each part of said polymeric resin and the amount of said non-solvent employed being from 0.05 to 3 parts for each part of said polymeric resin, adding the resin-solvent-non-solvent solution to water and a surface active agent with high shear to form an oil-in-water emulsion containing from 0.5 to 3 parts of organic phase for each part of water, the amount of said surface active agent being from 0.0005 to 0.005 part for each part of said organic phase, all parts expressed by weight, removing the solvent from said emulsion by distillation under reduced pressure and forming microcapsules of said polymeric resin in said emulsion, the non-solvent being present in the interior of said microcapsules, then removing the water and the non-solvent from said microcapsules by drying, said microcapsules being filled with air and being from 0.1 $\mu$ to 1.0 $\mu$ in diameter and having a wall thickness of from 3 percent to 30 percent of the diameter of said microcapsules.

5. Method according to claim 4 in which the water and the non-solvent are removed from the microcapsules by spray drying.

6. Method according to claim 4 in which the non-solvent employed is an aliphatic organic compound selected from the group consisting of mineral spirits, decane, dodecane, heptane, pentanol and mixtures thereof.

7. A method for preparing an emulsion comprising water and microcapsules of a thermoplastic polymeric resin containing a non-solvent in the interior of said microcapsules, said resin selected from the group consisting of polymethyl methacrylate, cellulose acetate butyrate, polyvinyl chloride, polyvinyl acetate, polystyrene and copolymers and mixtures thereof, which comprises admixing said resin with a solvent and non-solvent for said resin to form a solution, said solvent and said non-solvent being immiscible in water, said solvent selected from the group consisting of ethyl acetate, propyl acetate and mixtures thereof, the amount of said solvent employed being from 3–10 parts of each part of said polymeric resin and the amount of said non-solvent employd being from 0.05 to 3 parts for each part of the said polymeric resin, adding the resin-solvent-non-solvent solution to water and a surface active agent with high shear to form an oil-in-water emulsion containing from 0.5 to 3 parts of organic phase for each part water, the amount of said surface active agent being from 0.0005 to 0.005 part for each part of said organic phase, all parts expressed by weight, and removing the solvent from said emulsion by distillation under reduced pressure and forming microcapsules of said polymeric resin during the removal of said solvent, said microcapsules being suspended in said emulsion and containing the non-solvent in the interior of said microcapsules, and said microcapsules being of size from 0.1 $\mu$ to 1.0 $\mu$ in diameter.

8. Product according to claim 1 in which the spheroidal shaped, hollow microcapsules are polymethyl methacrylate.

9. Product according to claim 1 in which the spheroidal shaped, hollow microcapsules are cellulose acetate butyrate.

10. Product according to claim 1 in which the spheroidal shaped, hollow microcapsules are copolymers of cellulose acetate butyrate and polymethyl methacrylate.

11. Product according to claim 1 in which the spheroidal shaped, hollow microcapsules are polystyrene.

12. Product according to claim 1 in which the spheroidal shaped hollow microcapsules are copolymer of polyvinyl chloride and polyvinyl acetate.

* * * * *